Sept. 23, 1952 M. ALDEN 2,611,677

RECORDER BAR SUSPENSION FOR FACSIMILE RECORDERS

Filed Jan. 3, 1950 2 SHEETS—SHEET 1

Inventor
Milton Alden
by Roberts, Cushman & Grover
att'ys.

Inventor
Milton Alden
by Roberts, Cushman & Grover
Att'ys.

Patented Sept. 23, 1952 2,611,677

UNITED STATES PATENT OFFICE 2,611,677

RECORDER BAR SUSPENSION FOR FACSIMILE RECORDERS

Milton Alden, Wellesley, Mass.

Application January 3, 1950, Serial No. 136,512

7 Claims. (Cl. 346—74)

This invention relates to facsimile recorders and more particularly to recorders of the type wherein a strip of electrolytic recording material is fed between a helix of conducting material wrapped about a drum and a recorder bar which have impressed therebetween a varying potential.

With the conventional type of recorder bar suspension there is a tendency for the bar to tip or cock when in contact with the portions of the helix near the respective ends of the drum thereby resulting in a varying contact pressure and lack of uniformity in the record upon the recording strip. It is accordingly, therefore, the principal object of this invention to provide an improved recording bar and means for suspending the same which provide a substantially constant contact pressure between the bar and all points along the conducting helix.

Further objects of the invention are to provide a recorder bar which can be readily inserted and removed from the recorder without the need of special tools or skill, which automatically fits into proper recording position upon insertion, which is simple in construction, which can be readily adapted for use in existing recorders, and which advances the art generally.

In a broad aspect the invention contemplates in combination with a facsimile receiving apparatus, a recorder drum having thereupon a helical conductive track or raised wire upon which rides a recorder bar in an accurately selected position, the bar having at any position of the drum noncontacting portions that extend laterally of the track. Means are provided for minimizing the rocking or tipping of the bar on the track which comprise yieldable means interposed between and connecting the bar to its support, yieldably arranged to exert a greater force at the respective ends of the bar than at its center so that contact pressure between the bar and the track is substantially constant irrespective of the relative position of the point of contact therebetween.

In a more specific aspect the yieldable means comprises a block or bar of elastic material, for example rubber, which gradually varies in thickness from a maximum at its ends to a minimum at its mid-point so that as the block is compressed between the bar and the housing by the force resulting from contact with the drum track of the recorder greater pressure is exerted on the ends of the bar than at its center. In another aspect the yieldable block is of constant cross sectional area and is recessed in the housing, cover or other supporting portion of the recorder which recess has a greater depth at its center portion than at its ends whereby as the block is compressed therein by the bar a greater pressure is exerted on the respective ends than on the center. In a further aspect the ends of the block are backed up by plates interposed between the block and the support so that the amount of pressure exerted on the ends of the recorder bar can be controlled by adjustment for example by a screw mechanism for moving the respective plates.

In another important aspect the invention contemplates a cover adapted substantially fully to enclose the recorder compartment of the housing wherein is arranged a recorder drum, a recorder bar and supporting means therefor which yieldably fasten the bar to the cover and register it relatively to the drum. Such supporting means include a yieldable block fixed or recessed in the cover and to which is attached the forward portion of the recording bar by means of a dependent flange. The rear edge of the flange is engaged with a mating member in the cover to permit tilting of the bar about its rear longitudinal edge so that its front edge contacts the helical track, the yieldable means minimizing the tilting of the bar about a transverse axis.

Another feature of the invention is a recorder bar having a pivot edge and a helix contacting edge connected by a web cut away from opposite ends towards the center or otherwise perforated so that its effective longitudinal dimension is substantially reduced thereby reducing the stiffness so that the ends thereof can be depressed by the force exerted by any of the foregoing means.

These and other objects, aspects and features will be apparent from the following description of several illustrative specific embodiments of the invention referring to drawings in which Fig. 1 is a plan view of a recorder of the type incorporating one embodiment of the invention;

Figure 1:
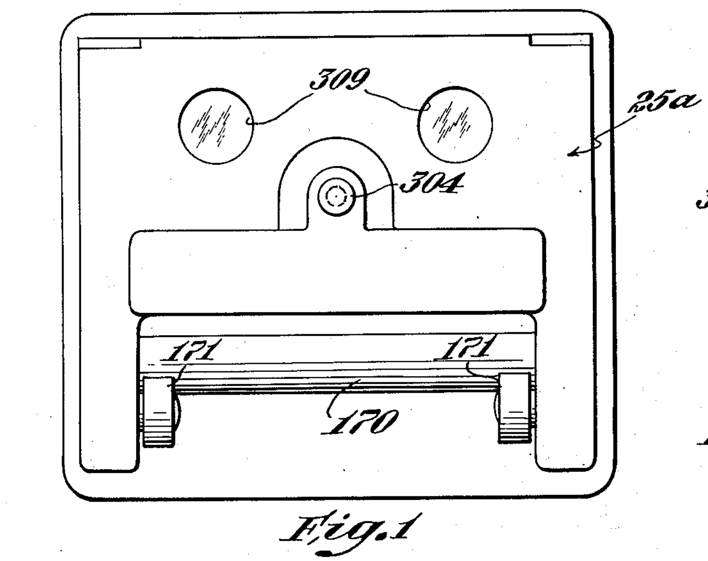
Figure 2:
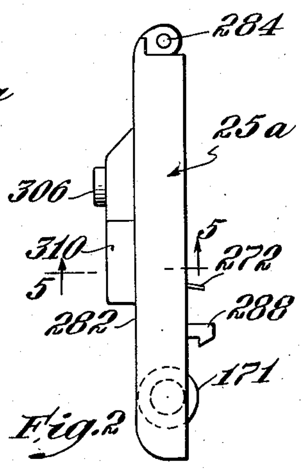
Fig. 2 is a side view of the cover of such recorder.
Figures 8, 9:
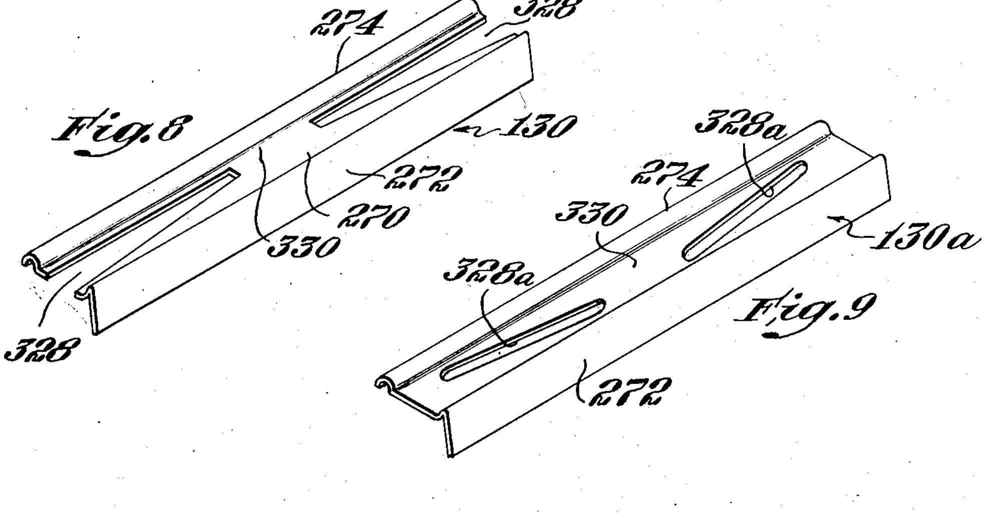
Fig. 8 is an isometric view of one type of recorder bar.
Fig. 9 is an isometric view of a second type of recorder bar.

Referring to Fig. 1 the numeral 25a designates a cover for a recorder of the type shown in my copending application No. 136,511, filed January 3, 1950, having a recorder compartment wherein is rotatably mounted a drum (not shown) carrying a conducting helix or track across which in contact with the edge 272 of the recorder bar is fed a tape or strip of electrolytic material which thence passes over the idler rolls 171 to a receiving station or roll not shown. As is shown in Fig. 8, one embodiment of a recorder bar according to the invention comprises an elongate thin sheet metal member formed into a channel and consisting of a web 270 having at its opposite edges respectively a recording flange 272 and with a downwardly facing convex groove 274 constituting a pivot edge. The convex groove 274 is arranged to rest in and pivotally support the rear edge of the recorded bar for movement about a complementary upwardly facing convex groove 276 (Fig. 4) formed at the lower edge of a bracket 278 depending from the inside of the cover 25a and attached thereto by means of screws 280.

The cover 25a is hinged to the housing as at 284 and has in its forward portion a transverse depending wall 286 adapted to form with the top edge of the wall (not shown) of the record compartment a narrow slot through which the recording tape passes as is described in detail in my copending application Serial No. 136,511, filed Jan. 3, 1950.

Figure 3:
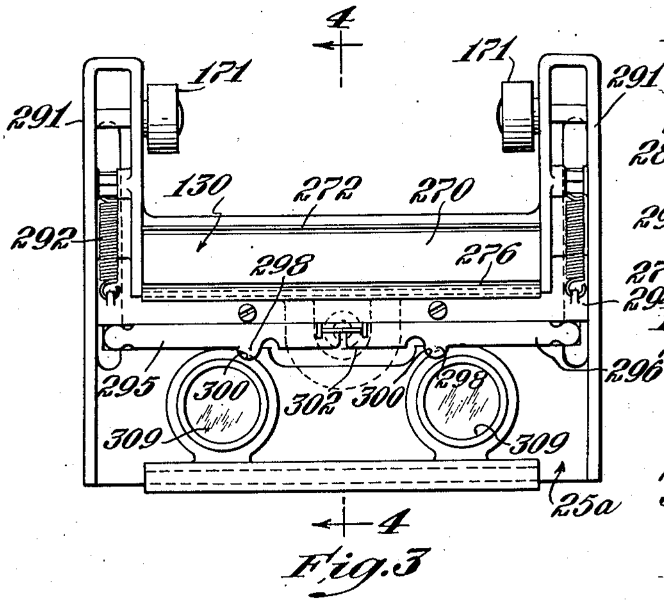
Fig. 3 is a bottom view of the cover with the recording bar in place.

The cover 25a is locked closed by a pair of spaced latches 288 pivoted at 290 in channel-shaped projections 291 (Fig. 3) at opposite sides of the cover and are yieldably held in locking engagement by means of springs 292. The latches 288 are released to permit tilting back the cover 25a by a pair of slide plates 294 which engage the latches beyond their pivot points 290 and which extend rearwardly along the top of the channel portions 291 being pivotally connected to transversely extending bars 295. These bars have pivot projections 298 on their rear sides seated in recesses 300 and are caused to pivot in said recesses by a plunger 304 (Fig. 4) which cooperate with flanges 302 formed on the inner ends of the bars 296. The plunger has a head 306 fixed thereto which projects above the top of the cover and is yieldably held in an operative position by a spring 308. The cover 25a also carries the rolls 171 for cooperation with the delivery roll 170 (Fig. 1) in the housing and is provided with glazed peep apertures 309.

Figure 4:
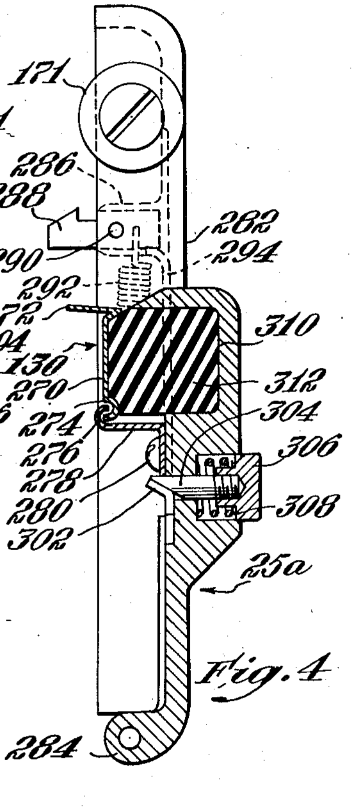
Fig. 4 is a sectional view on line 4—4 of Fig. 3.

Extending transversely of the cover 25a is a recess 310 which, as shown in Fig. 4, is substantially rectangular in cross section and has seated therein a resilient block 312, preferably composed of sponge rubber, which projects downwardly from the recess into contact with the web portion 270 of the recorder bar 130 being secured thereto by adhesive or other suitable means so that the forward portion of the recorder bar is supported.

Figure 5:
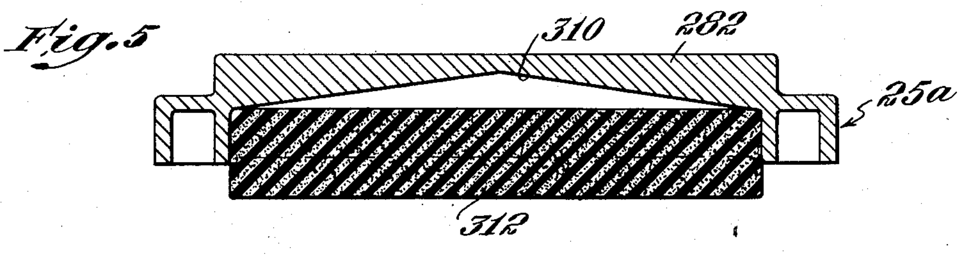
Fig. 5 is a sectional view on line 5—5 of Fig. 3.

With recorder bars of the conventional type which are pivotally supported at the respective ends thereof in brackets secured to the recorder housing, the pressure exerted by the helical conductor is not uniform and tends to tilt the bar in contact positions near either end of the drum resulting in inferior quality of records. Such nonuniformity of recording pressure is particularly pronounced when the length of the drum is comparatively short. It has been found that the tilting or cocking of the bar is eliminated and that the uniformity of recording is improved by incorporating resilient means between the bar and the helix for supplying a force which progressively decreases by a slight amount as the point of contact shifts from either end toward the center of the drum, so that the contact pressure resulting from all the forces is substantially constant at all points of contact. Accordingly, as shown in Fig. 5, the bottom face of the recess 310 in the cover 25a is cambered so that it is somewhat deeper at the central portion thereof. With a substanitally rectangular sponge rubber block 312 inserted in the recess 110, the block will yield more toward the center of the recording bar than at its ends and hence there is improved uniformity in the recording.

Figure 6:
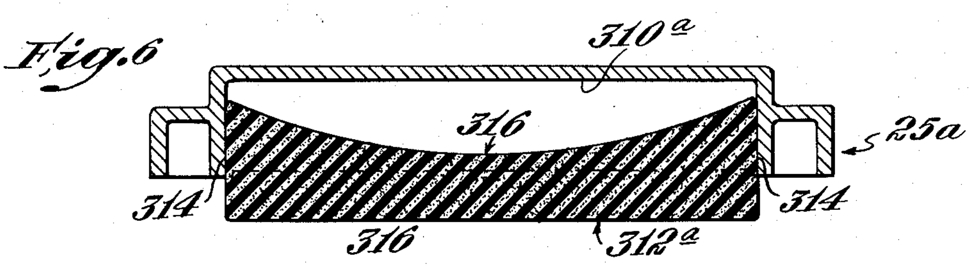
Fig. 6 is a sectional view similar to Fig. 5 of another embodiment of the invention.

This same result may also be accomplished, as shown in Fig. 6, by forming a recess 310a which is of rectangular cross section and by inserting therein a sponge rubber block 312a the thickness of whose adjacent face is progressively decreased from its ends 314 to its mid-portion 316. When the cover 25a is open, the block 312a is only partially seated in the recess 310a as illustrated in Fig. 6. When fully seated upon the contact of the recorder bar edge 272 with the helix by closing of the cover, the concave upper side of the block will be forced against the bottom of the recess 310a and hence the pressure that the block will exert on the recorder bar will be greatest at the ends.

Figure 7:
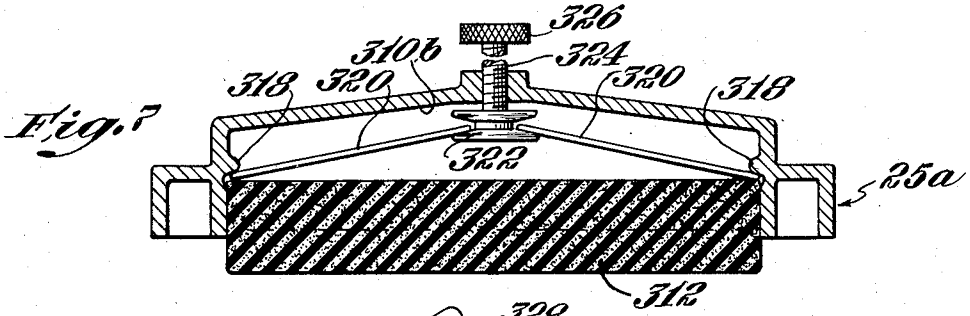
Fig. 7 is a sectional view similar to Fig. 5 of a third embodiment of the invention.

In yet another means of accomplishing this result, as illustrated in the embodiment in Fig. 7, the recess 310b is provided with two inwardly projecting shoulders 318 and between these shoulders and the sponge rubber block 312 there is inserted in the recess the respective outer ends of compressing members such as the pair of thin plates 320. The inner ends of the plates 320 are disposed between the flanges of a spool 322 to form a cavity essentially similar in shape and having the same function as the cavity 310 of the embodiment shown in Fig. 5 and described above. The spool 322 is fixed to a threaded stem 324 projecting through the top portion of the cover 25a and having a knurled head 326 thereon by which the screw may be rotated to adjust the pressure exerted by the plates 320 against the upper surface of the rubber block 312. As shown in Fig. 7, the block 312 projects somewhat from the cavity formed by the plates 320 but upon closing of the cover will be squeezed upwardly into engagement with the plates.

As is shown in Fig. 8, the web portion 320 of the recorder bar 130, when employing the types of support just described in which the rubber block support is used, is cut away from opposite ends toward the center as at 328. When so constructed the recording edge 272 is connected to the pivot edge 274 by a comparatively narrow web 330 which decreases the stiffness between the parts and allows longitudinal bending under force from the yieldable block 312 without distortion of the recording edge. It is also possible to reduce the longitudinal stiffness of the recording bar such as 130a (Fig. 9) to obtain comparable results by providing slots 328a which serve the same function as the cutaway portions 328 in the bar 130 (Fig. 8).

It should be understood that the present disclosure is for the purpose of illustration only and that this invention includes all modifications and equivalents which fall within the scope of the appended claims.

I claim:

1. For use in a recorder of the type having a rotatable helix electrode, a stationary electrode assembly comprising a supporting housing; a recorder bar pivotally attached to said housing; and a block of yieldable material interposed between the housing and the bar, one of the adjacent faces of the block and housing being cambered so that, when the block is not deformed, only the ends thereof are in contact with the housing, the faces abutting, as the block is compressed by the action of the helical electrode, to apply a substantially constant pressure between the helical electrode and the recorder bar.

2. For use in a recorder of the type having a rotatable helix electrode, a stationary electrode assembly comprising a recessed supporting housing; a recorder bar pivotally attached to said housing; and a block of resilient material interposed between the bottom face of the housing recess and the bar, one of the adjacent faces of the block and housing recess being cambered so that, when the block is not deformed, only the ends thereof are in contact with the housing, the faces abutting, as the block is compressed by the action of the helical electrode, to apply a substantially constant pressure between the helical electrode and the recorder bar.

3. For use in a recorder of the type having a rotatable helix electrode, a stationary electrode assembly comprising a recessed supporting housing, a recorder bar pivotally attached to said housing; and a block of resilient material interposed between the bottom face of the housing recess and the bar, the bottom face of the recess adjacent the correlated face of the block being cambered so that, when the block is not deformed, only the ends thereof are in contact with the housing, the faces abutting, as the block is compressed by the action of the helical electrode, to apply a substantially constant pressure between the helical electrode and the recorder bar.

4. For use in a recorder of the type having a rotatable helix electrode, a stationary electrode assembly comprising a recessed supporting housing; a recorder bar pivotally attached to said housing; and a block of resilient material interposed between the bottom face of the housing recess and the bar, the face of the block adjacent the bottom face of the recess being cambered so that, when the block is not deformed, only the ends thereof are in contact with the housing, the faces abutting, as the block is compressed by the action of the helical electrode, to apply a substantially constant pressure between the helical electrode and the recorder bar.

5. For use in a recorder of the type having a rotatable helix electrode, a stationary electrode assembly comprising a supporting housing; a recorder bar including an effective recording edge and a pivot edge connected by a web, said pivot edge being pivotally attached to said housing; and a block of resilient material interposed between the housing and the web, one of the adjacent faces of the block and housing being cambered so that when the block is not deformed, only the ends thereof are in contact with the housing, the faces abutting as the block is compressed by the action of the helical electrode, to apply a substantially constant pressure between the helical electrode and the recorder bar.

6. A stationary electrode assembly according to claim 5 wherein the effective recording edge is one edge of a flange disposed substantially normally to the plane of the web.

7. A stationary electrode assembly according to claim 6 wherein the flange and web are integrally formed of material having a substantially uniform thickness, the web having cut-away portions so that the stiffness thereof is reduced.

MILTON ALDEN.

REFERENCES CITED

The following references are of record in the file of this patent:

UNITED STATES PATENTS

| Number | Name | Date |
|---|---|---|
| 2,380,467 | Ressler | July 31, 1945 |
| 2,391,765 | Artzt | Dec. 25, 1945 |
| 2,415,229 | Young | Feb. 4, 1947 |
| 2,421,673 | Young | June 3, 1947 |